(12) United States Patent
Rafizadeh

(10) Patent No.: US 7,356,677 B1
(45) Date of Patent: Apr. 8, 2008

(54) COMPUTER SYSTEM CAPABLE OF FAST SWITCHING BETWEEN MULTIPLE OPERATING SYSTEMS AND APPLICATIONS

(75) Inventor: Schumann Rafizadeh, Houston, TX (US)

(73) Assignee: Flash Vos, Inc., Houston, TX (US)

( * ) Notice: Subject to any disclaimer, the term of this patent is extended or adjusted under 35 U.S.C. 154(b) by 365 days.

(21) Appl. No.: 10/274,670

(22) Filed: Oct. 18, 2002

Related U.S. Application Data

(60) Provisional application No. 60/348,153, filed on Oct. 19, 2001.

(51) Int. Cl.
G06F 9/445 (2006.01)
G06F 15/177 (2006.01)

(52) U.S. Cl. .................... 713/1; 713/2; 713/300
(58) Field of Classification Search ............ 713/1, 713/2
See application file for complete search history.

(56) References Cited

U.S. PATENT DOCUMENTS

| | | | |
|---|---|---|---|
| 5,134,580 A | | 7/1992 | Bertram et al. |
| 5,136,711 A | * | 8/1992 | Hugard et al. ............... 713/2 |
| 5,802,363 A | * | 9/1998 | Williams et al. ............ 713/2 |
| 6,088,794 A | | 7/2000 | Yoon et al. |
| 6,178,503 B1 | | 1/2001 | Madden et al. |
| 6,324,627 B1 | * | 11/2001 | Kricheff et al. ............ 711/163 |
| 6,385,721 B1 | * | 5/2002 | Puckette ..................... 713/2 |
| 6,401,183 B1 | | 6/2002 | Rafizadeh |
| 6,615,365 B1 | * | 9/2003 | Jenevein et al. ............ 714/6 |
| 6,973,447 B1 | * | 12/2005 | Aguilar et al. ............. 707/1 |
| 7,024,549 B1 | * | 4/2006 | Luu et al. .................. 713/2 |
| 2001/0018717 A1 | * | 8/2001 | Shimotono .............. 709/319 |
| 2003/0097393 A1 | * | 5/2003 | Kawamoto et al. ......... 709/1 |

FOREIGN PATENT DOCUMENTS

| | | | |
|---|---|---|---|
| JP | 25017192 | * | 4/1994 |
| JP | 25701392 | * | 4/1994 |

OTHER PUBLICATIONS

IBM Technical Disclosure.*

* cited by examiner

Primary Examiner—A. Elamin
Assistant Examiner—Fahmida Rahman
(74) Attorney, Agent, or Firm—Keeling Patents & Trademarks; Kenneth Beyers

(57) ABSTRACT

A method and apparatus is presented that allows rapid switching between multiple operating system environments on a single computer, through the use of a Super Operating System operating between the computer system's firmware level and a plurality of bootable operating systems and applications. Relevant data, such as hardware controls, bootable operating systems, and applications software, are grouped onto physical partitions in physical memory. Combinations of compatible partitions can be assigned to a cabinet to create a virtual computer system. A given partition is assignable to multiple cabinets. By operating above the virtual computer systems, the Super Operating System uses the suspend and resume functions of the power management support functions to suspend and hybernate one operating virtual computer system, while activating and operating an alternate virtual computer system on the same computer.

7 Claims, 12 Drawing Sheets

100 POWER ON

102 BIOS RUN POST

104 BIOS IDENTIFIES MBR

106 BIOS BOOTS SUPER OS

108 SUPER OS IDENTIFIES FAST OFF FLAG

110 SUPER OS PROVIDES USER OPTION OF ACTIVATING SUSPENDED OS1, OPTIONALLY ENTER PASSWORD

112 IF ACTIVATION OF SUSPENDED OS1 ELECTED, SUPER OS ACTIVATES WITH SYSTEM CONTEXT AT TIME OF SUSPENSION

114 IF SUPER OS DOES NOT IDENTIFY FAST OFF FLAG OR STEP 112 NOT ELECTED, NORMAL IPL OF OS1

116 OPERATE OS1

118 USER ACTIVATES SUPER OS AGENT IN OS1

120 USER SELECTS FAST OFF

122 SUPER OS SUSPENDS OS1

124 SUPER OS POWERS OFF

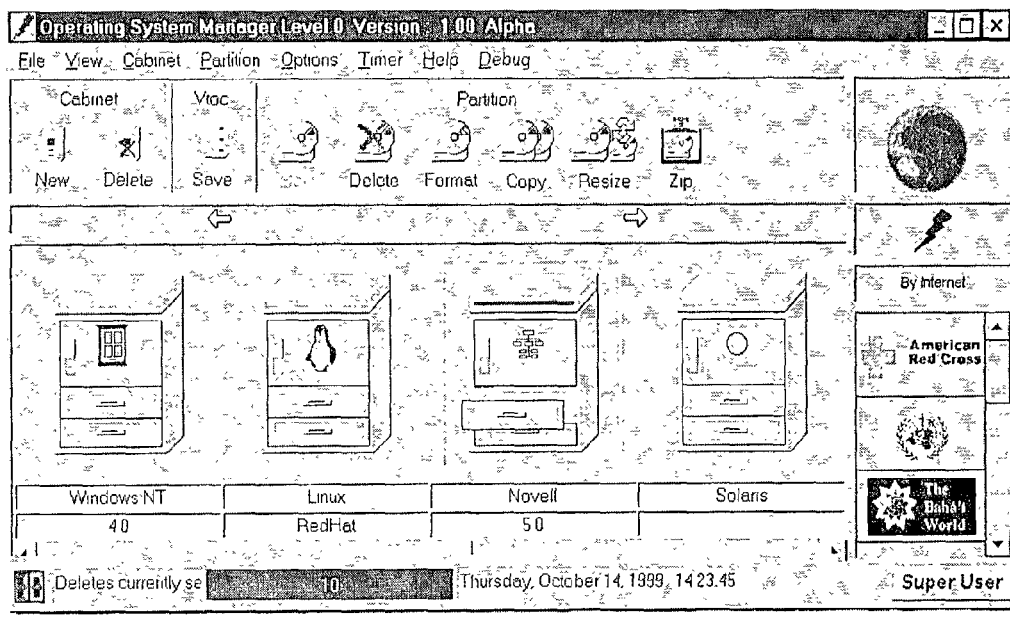

Figure 1

Flash VOS MBR Structure

| offset | name | length | content |
|---|---|---|---|
| 0 | IPL | 400 bytes | Initial Program Loader |
| +0x190 | Secondary boot loader descriptor | 16 bytes | - 4 bytes - BOOT_MAGIC_NUMBER (0x544F4F42 "BOOT")<br>- 2 bytes - number of sectors in boot loader<br>- 2 bytes - reserved<br>- 8 bytes – start sector of boot loader from the beginning of the disk |
| +0x1A0 | VTOC descriptor | 16 bytes | - 4 bytes - VTOC_MAGIC_NUMBER (0x434F5456 "VTOC")<br>- 4 bytes - - number of sectors VTOC<br>- 8 bytes – start sector of VTOC from the beginning of the disk |
| +0x1B0 | Reserved for compatibility with NT | 14 bytes | - 8 bytes – reserved<br>- 4 bytes – NT_VOLUME_ID<br>- 2 bytes reserved |
| +0x1BE | Legacy Partition table | 64 bytes | 4 partition records, 16 byte each |
| +0x1FE | Magic Number | 2 bytes | 0x55, 0xAA |

Figure 2

100 POWER ON

102 BIOS RUN POST

104 BIOS IDENTIFIES MBR

106 BIOS BOOTS SUPER OS

108 SUPER OS IDENTIFIES FAST OFF FLAG

110 SUPER OS PROVIDES USER OPTION OF ACTIVATING SUSPENDED OS1, OPTIONALLY ENTER PASSWORD

112 IF ACTIVATION OF SUSPENDED OS1 ELECTED, SUPER OS ACTIVATES WITH SYSTEM CONTEXT AT TIME OF SUSPENSION

114 IF SUPER OS DOES NOT IDENTIFY FAST OFF FLAG OR STEP 112 NOT ELECTED, NORMAL IPL OF OS1

116 OPERATE OS1

118 USER ACTIVATES SUPER OS AGENT IN OS1

120 USER SELECTS FAST OFF

122 SUPER OS SUSPENDS OS1

124 SUPER OS POWERS OFF

FIG. 10

- Fast Suspend is implemented using SOS Agents
- It is always safe to power off in SOS GUI (Default VPC)
- Bios always performs either Suspend, Resume or IPL
- Active state (if no VPC is selected) is SOS GUI (Menu)

COMPUTER SYSTEM CAPABLE OF FAST SWITCHING BETWEEN MULTIPLE OPERATING SYSTEMS AND APPLICATIONS

CROSS-REFERENCE TO RELATED APPLICATIONS

This application claims the benefit of U.S. Provisional Application No. 60/348,153, filed Oct. 19, 2001. This application contains subject matter related to U.S. Application No. 90/283,418, filed on Apr. 1, 1999 by Shumann Rafizadeh, assigned to Flash Vos, Inc., now U.S. Pat. No. 6,401,183 B1, titled "Storage Manager for Computer Devices and Method for Manipulating Secondary Storage"; U.S. patent application Ser. No. 09/376,825, filed by Rafizadch et al. on Aug. 18, 1999, titled "Restrictive Partitioning of Secondary Storage Physical Devices"; U.S. patent application Ser. No. 09/409,013, filed by Moayyad and Rafizadeh on Sep. 29, 1999, titled "Graphical User Interface for Storage Management of Super Operating System Based Computers"; U.S. patent application Ser. No. 09/517,545, filed by Rafizadeh et al. on Mar. 2, 2000, titled "Downloading Operating Systems and Partitions via the Internet"; U.S. patent application Ser. No. 09/566,333, filed by Rafizadeh on May 8, 2000, titled "Method to Monitor and Control Operating Systems".

STATEMENT REGARDING FEDERALLY SPONSORED RESEARCH OR DEVELOPMENT

Not applicable.

BACKGROUND OF THE INVENTION

1. Field of Invention

This invention relates to the use of the existing power management facilities of a computer, workstation, or server by a Super Operating System to quickly switch between multiple operating systems and/or environments.

2. Description of Related Art

Typical computers, known to the public, are comprised of hardware, controlled by a single operating system, which in turn regulate the use of the hardware components by application software compatible with the particular operating system. Operating systems have been designed to assess, catalog and take control of all the resources of a computer system in order to efficiently allocate those resources to the application programs. As such, operating systems are basically hostile to another operating system, if installed and operating on a single system, unless appropriate measures are employed to segregate the domain of each operating system.

Segregation may be accomplished through selecting a single operating system to initiate upon bootup. The particular operating system is given full control of the computer system, but only compatible application software can function. If an application program, compatible only in a different operating system environment, is needed to operate on the computer system, the system must be shutdown, unloading the current operating system, and then rebooted, selecting the operating system that provides the necessary environment of the needed program. The new operating system is given full control during this session, and the necessary program can be executed.

An alternative manner of segregating operating systems is to isolate independent systems on separate computer workstations or servers. Then by networking the systems, through standardized networking protocols, the operating systems can interact, but the network maintains the isolation of each independent operating system's realm of control to the particular node on the network.

As computer technology has assumed a greater importance in society, advancements have developed to provide greater and faster performance for the individual computer systems. Examples of related art computer technology advances include recent patents that have made gradual improvements in the way computer systems are utilized. Specifically, several methods are described in the prior art that allow multiple operating systems to be installed in a computer, such that users may choose which operating system to boot or resume from the suspended state after the computer is powered up.

U.S. Pat. No. 6,178,503 for Managing Multiple Operating Systems on a Single Computer, issued to Madden et al., discloses a graphical user interface ("GUI") for managing multiple operating systems on a single computer and performing other boot-time operations. The GUI approach is an improvement over the pre-existing boot manager menu for selecting an operating system in a computer with multiple operating systems, in which multiple operating systems are present simultaneously on the permanent storage of the computer. This disclosure provides for a single operating system to be initiated during a computer use sessions. Use of an alternate operating system is separated by a system shutdown.

Yoon et al., U.S. Pat. No. 6,088,794, titled Computer Systems Capable of Selective Booting from Two Hard Disk Drives, discusses a computer system having two fixed disk drives with a different operating system stored in each disk drive, in which selective booting and suspend/resume operations of the power management function can be performed through the two fixed disk drives. Each of the two disk drives has a reserved data storage area for the suspend operation. A port exchanger intervenes in response to a bus exchange control signal fed from a system controller, and passes or cross-switches the IDE interface signal paths directed to the hard disk drives to select an operating system. A controller produces the bus exchange control signal, under system management control, by referring to the hard disk drive status information during the boot or resume process. The user is limited to two operating systems in configurations with two hard drives.

Bertram et al., U.S. Pat. No. 5,134,580, discloses a computer with capability to automatically initialize in a first operating system of choice, and reinitialize in a second operating system, without computer shutdown. A computer system with read-only memory and permanent read/write memory allows the user to load an alternate operating system at the conclusion of a session without turning the computer off and then on. A customization word with a system request bit in read/write memory is responsible for bringing the machine up in the alternate operating system located in an external memory (on a diskette or fixed disk). The application program code triggers the switch, which is out of control of the user.

Other related art patents include Williams et al., U.S. Pat. No. 5,802,363, titled BIOS Dynamic Emulation of Multiple Diskettes from a Single Media; Cox et al., U.S. Pat. No. 5,361,358, titled System and Method for Installing Program Code for Operating from Multiple Bootable Operating Systems; Reynaud et al., U.S. Pat. No. 6,061,788, titled System and Method for Intelligent and Reliable Booting; Mori, U.S. Pat. No. 4,626,986 titled Processor having Plural Initial Loading Programs for Loading Different Operating Systems; Lin et al., U.S. Pat. No. 6,192,456B1 titled Method and Apparatus for Creating Formatted Fat Partitions with a Hard Drive Having a BIOS-less Controller; Beelitz et al., U.S. Pat. No. 6,247,126, titled Recoverable Software Installation Process and Apparatus for a Computer System; Ruff, U.S. Pat. No. 6,178,487B1, titled Manipulating Disk Partitions Between Disks; Orcutt, U.S. Pat. No. 6,185,575, titled In-Place Disk Partition Canonization and Storage Optimization; O'Brien et al., U.S. Pat. No. 5,278,973, titled Dual Operating System Computer; Murray et al., U.S. Pat. No. 6,185,666, titled Merging Computer Partitions; Wisecup, U.S. Pat. No. 6,167,532, titled Automatic System Recovery. The common and existing technology among these patents include means for managing partitions on removable and fixed storage media, installing multiple operating systems on a computer, and selectively booting one of the installed operating systems.

It would be an improvement to the art to use the existing BIOS power management capabilities to facilitate fast switching between operating systems in conjunction with a Super OS. Suspend and resume capabilities are widely used today and present in most personal computers, be they battery-operated notebook computers or typical desktop computers. The capabilities provided by the BIOS power management standard are intended to facilitate power savings by permitting users to suspend the operations of the computer during brief interruptions, and quickly resume operation at the conclusion of the interruption.

The present invention allows users to quickly switch between multiple active operating systems and application environments, without requiring a shutdown of one operating system (and the applications it hosts), and then the booting of another operating system, launching of the applications it hosts. Towards this end, the invention activates a Super Operating System (referred to herein from time to time as Super OS or SOS) in between the firmware instructions of the hardware and typical operating system function. The Super OS can then permit one operating system, contained to a virtual computer system, to hybernate, while the Super OS retains control of the basic computer system operation. With the recently resident OS suspended, the Super OS is able to boot an alternate OS, or resume a previously hybernated alternate OS, and give over total control to a virtual computer system, specifically structured for that particular OS form the total computer system assets. While the standard OS operates within its virtual PC, it is not affected by the recently suspended OS, or processes that OS had been processing with the computer resources that the now-resident OS is using. This includes data, which the user, through the Super OS has chosen to share with both Operating systems.

Super Operating Systems such as Flash Vos, as described in U.S. patent application Ser. No. 09/283,418, filed by Rafizadeh on Apr. 1, 1999, now U.S. Pat. No. 6,401,183, titled "Storage Manager for Computer Devices and Method for Manipulating Secondary Storage", and U.S. patent application Ser. No. 09/285,147, for Flash Vos—"Virtual Operating System", filed by Rafizadeh on Mar. 31, 1999, solve the problem of operating system hardware dominance by virtualizing the computer system's resources and allowing operating system independent control of an entire virtual system of such resources, including an ability to effectively operate multiple operating systems on a single computer, through the creation of multiple, independent virtual systems. The present invention increases the utility of such Super Operating Systems in that it enables faster switching operations between multiple operating systems and applications operating on the same computer.

In many cases computer performance can be significantly enhanced by the timely utilization of applications, and by the availability of more computing resources beyond the design capacity or the Operating System's original design. For example, the Windows 9X Operating Systems were designed in the 1980s with inherent limitations, which at that point appeared generously adequate. The designers clearly did not foresee the expansion of computing resources and capabilities, to include volumnous memory, the integration with audio and video components, appliance-like devices, such as handhelds and laptops, and wireless ports, which permit device to device transfer of data wherever a portable device may be located. It is now even possible to make a computer asset, remotely located across a network, part of a virtual computer, and assign that virtual computer for use by an OS designed for use on a 486 processor.

Finally, the Fast Switching method and apparatus saves users valuable time in accessing applications directly and immediately in multiple operating systems environments, and eliminates the need for cold starts and stops of the user environments, unless the user determines that such a reset is warranted. The integration of selected standard power management features into the Super OS graphical user interface ("GUI") provides the user with a comprehensive Fast OS Switching management tool. The novel use of the power management features in the BIOS enables a user to quickly initiate a computer environment in one operating system, and then quickly switch between multiple operating systems and/or environments.

BRIEF SUMMARY OF THE INVENTION

The present invention establishes a Fast Switching method, comprised of a Fast Resume method and a Fast Suspend method. The Fast Resume method makes modified use of the BIOS power management standard, inherant in many computers, to allow a computer user to quickly transfer to an operating state one of a number of operating system ("OS") environments, in a suspended state, as an alternative to the slow process of starting with Power-On Self-Test ("POST") and loading of all the components of an operating system from the cold boot state via the initialization programs. Conversely, the Fast Suspend method makes modified use of the BIOS power management standard, providing fast shutdown of an operating system to its suspended or hibernated state. This Fast Suspend method is an alternative to the customary and systematic termination of all services that forces the closure of all open files and cached information, shutdown of all devices and drivers, and system power off. The BIOS power management standard still supports the system shutdown and/or system restart with a cold boot at the users' discretion, when it is required for events such as a configuration change, addition or deletion of hardware components, new applications, or system upgrades.

The Fast Switching method and apparatus of the present invention also allows improved monitoring and control of a target computer's operating system(s) via the Internet or similar remote communication systems, allowing a computer user to manage and supervise other computers and operating systems more efficiently. With the Fast Switching capability, a computer user is able to more effectively operate a wider range of application programs, thus benefiting from the efficiency of activating more than one operating system in his computer or a target computer. Furthermore, the Fast Switching of a remote computer via the Internet permits faster software systems upgrades in the remote computer, since the Super OS does not require reprogramming to support version changes of the managed Operating systems.

One of the key features of this invention is the novel use of the power management (ACPI or APM or alike) support functions of the runtime (standard) OS and the BIOS to temporarily evict that OS from memory and switch to the next OS requested by the user. Thus, when the user wishes to return to the suspended OS, he need not reboot and start from the cold state. Instead, the user can switch back to the suspended OS and resume operations quickly, in a manner similar to turning on an appliance. Additionally, the resident OS, which ever it may be, may be allowed to occupy and control all of the computer's processing resources.

According to an aspect of the present invention, a method and apparatus are provided for each computer user in a network of several computers connected via the Internet or the like, to be able to Fast Switch the applications and operating systems in any other computer on the network. Each of the computers connected in this manner can be loaded with a particular application and/or operating system, all of which are not necessarily manufactured by the same company, or even considered compatible by prior art management methods and apparatuses. The method and apparatus of this invention is able to Fast Switch the applications or operating systems from various software providers, and quarantine their non-compatible activities.

Accordingly, the objectives of this invention are to provide, inter alia, a computer system method that:
- can be directly powered up to application operation level locally or remotely, via a single operating system, Super OS, and Virtual Personal Computer ("Virtual PC") operating system utilities;
- can facilitate fast switching from one application environment to another by a single operating system, by Super Operating System(s), and by Virtual PC operating systems;
- can fast Power Off, Suspend, or Hibernate, and conversely Resume and Switch On a standard operating system, and use these capabilities for switching of operating systems in Super OS and Virtual PC operating system environments;
- can include more than one bootable operating system, each for a separate and independent device or logical system;
- can include a Resume option in the BIOS setup, giving users the choice of resuming any selected operating systems from a secondary storage device via Super OS, boot manager, or other utilities;
- can set aside a dedicated entry in the partition table of the master boot record (MBR) for use of the save partition, in order to store the context for switching;
- can set aside files for use as save space to store the context for subsequent restores;
- can use prior art power management features of a runtime operating system on personal computers, laptops, and servers to suspend that operating system by suspending its use of the system, and give control of system resources to the user for Fast Switching;
- can use prior art power management features to switch back to a suspended operating system by resuming its control, rather than by cold reboot; or, alternatively, restart via a Fast Resume in embedded single operating system, Super OS, and Virtual OS environments;
- can provide password protection for accessing applications and operating systems;
- can provide improved monitoring and control of a target computer's operating systems via the Internet or other remote communication system, allowing computer users to manage and supervise other computers and operating systems more efficiently;

Other objects of the invention will become apparent throughout the specification hereinafter disclosed.

BRIEF DESCRIPTION OF THE DRAWINGS

FIG. 1 illustrates a sample boot view of the Super OS;
FIG. 2 illustrates an updated prior art MBR to allow for VTOC enhancements;
FIG. 10 is a schematic representation of the steps in one embodiment of the invention.

DETAILED DESCRIPTION OF THE INVENTION

Figure 3:
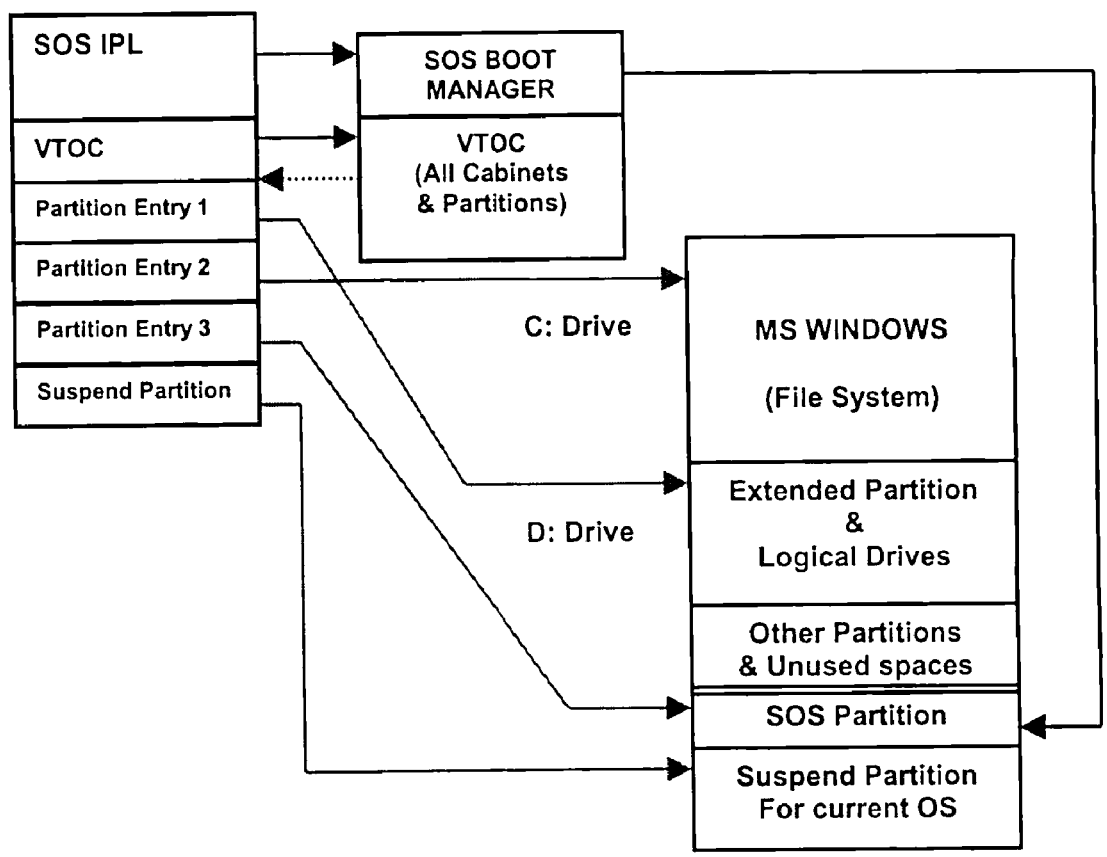
FIG. 3 depicts the hard disk structure of a typical Virtualized PC storage layout.

In an embodiment of the present invention, a method of managing a computer system provides for rapid switching among operating systems ("OS") of a computer having multiple installed operating systems. This inventive method and system manager device make special use of the prior art power management ("PM") support functions of the runtime operating system and the basic input/output system ("BIOS") to save a currently active operating system environment in a storage device and prepare to turn off the computer system, or to switch to, execute, activate or initiate, another operating system as designated by the user. An operating system that is suspended by the PM may be referred to as being suspended, hibernating or in a suspended state. When the user wishes to activate a suspended (hibernating) operating system environment, he need not reboot the computer and start from the cold state. Instead, the user can switch back to the suspended operating system and quickly resume operation of operating system and applications, in a manner similar to turning on an appliance.

The following pending patent applications are incorporated herein by reference:

U.S. patent application Ser. No. 09/283,418, filed by Rafizadeh on Apr. 1, 1999, now U.S. Pat. No. 6,401,183, titled "Storage Manager for Computer Devices and Method for Manipulating Secondary Storage", discloses a storage manager that manipulates and partitions the secondary storage of a computer device and a virtual table of contents.

U.S. patent application Ser. No. 09/376,825, filed by Rafizadeh et al. on Aug. 18, 1999, titled "Restrictive Partitioning of Secondary Storage Physical Devices", discloses a method for restrictive partitioning of secondary storage devices.

U.S. patent application Ser. No. 09/409,013, filed by Moayyad and Rafizadeh on Sep. 29, 1999, titled "Graphical User Interface for Storage Management of Super Operating System Based Computers", describes a graphical user interface that facilitates the use of a Super Operating System and remote monitoring and management of operating systems.

U.S. patent application Ser. No. 09/517,545, filed by Rafizadeh et al. on Mar. 2, 2000, titled "Downloading Operating Systems and Partitions via the Internet", describes a method for uploading and downloading of operating systems to and from a remote entity.

U.S. patent application Ser. No. 09/566,333, filed by Rafizadeh on May 8, 2000, titled "Method to Monitor and Control Operating Systems", describes a method for monitoring and controlling the functions of a local computer and/or remote computers.

The following terms are used herein, and are described in more detail in the foregoing described related pending applications:

The Virtual Table of Contents ("VTOC") is a data structure maintained on secondary storage, but outside the primary file systems. The VTOC contains all necessary information about the Virtual Personal Computer ("Virtual PC") environment of a physical computer. This includes storage information, partitions and file systems. Furthermore, the VTOC defines Cabinets (Virtual PC's). A Cabinet or Virtual PC is a set of partitions and file systems that are visible and available to a given operating system environment when that environment is actively executing on the physical computer. For PC's with multiple hard disks, the VTOC is stored as a Disk Table of Contents ("DTOC") on each disk.

The Super OS Boot Manager boots the default OS or the Super OS GUI, manages system resources, allocates system resources (e.g., storage) to different OS file systems, and maintains the VTOC.

The Super OS Agent is an application program tailored to run under a given operating system environment. The Super OS Agent handles the switching of operating systems within a computer, and supports remote management of multiple operating systems. The Super OS Agent provides access to VTOC and Cabinets, allowing each environment to be used in its native mode, with full system functionality. The Super OS Agent is described in application Ser. No. 09/517,545 and in application Ser. No. 09/566,333 wherein it is described as "Flash Vos Agent."

The Super OS Remote Manager provides remote management functions via the Internet. It is utilized for uploading and downloading of compressed system images, data sharing, save/restore services, embedded application support, multi-lingual (international) support, and OS-independent software upgrades as well as monitoring and control.

The Super OS GUI provides a graphical user interface ("GUI") to the Super OS functions.

A sample boot view of the Super OS is depicted in FIG. 1. On this screen, a user selects a Cabinet (Virtual PC) from the available Virtual PCs, in order to activate that selected environment. The selected Virtual PC will be highlighted and a Cabinet or Cabinets will appear.

As used herein, the terms "Cabinet" and "Virtual PC" are interchangeable. For example, a user may select a Virtual PC containing Microsoft Windows 98. The Microsoft Windows 98 Cabinet may contain multiple partitions, and one boot partition. A user can share partitions between Cabinets. Partitions are treated like "File Drawers" that contain files and folders. Each "Drawer" of a Cabinet may have a different file format (file system), such as FAT-16, FAT-32, NTFS or EXT2FS.

Data relevant in an operational way to each other is grouped into the same or associated partitions. In this way partitions of relevant data may be systematically organized and assigned to various Virtual PC's (Cabinets) where the capabilities of the particular data is useful to the functional operation of the particular Virtual PC system. If the operating system of a particular Virtual PC system is not compatible with the data of a partition, the data is not useful to the Virtual PC. That is why care should be taken to ensure a partition with one type of data is not assigned to another, non-compatible Virtual PC system.

In a Virtual PC, the information needed by each OS to be operable and to operate independently from all other OS's and embedded applications, and to control its Virtual PC environment, is stored in a VTOC data structure. Virtualization of storage for PC's is accomplished by dynamically loading the necessary data into the master boot record ("MBR"), Partition Tables, and Headers such that the currently active operating system environment believes that it is the only OS running, and that it has total control over all storage resources (in reality, the OS environment can only access the resources assigned to its Cabinet). This dynamic loading of critical information is accomplished before control of the system is turned over to the runtime OS.

An important function of virtualization is to ensure that the integrity of other environments is protected from the runtime OS. This is accomplished by the "restrictive partitioning" or "partition hiding" feature of the Super OS. This technology can be implemented in hardware (the firmware of the disk drives), or in software as part of the Super OS.

Most of today's widely used operating systems are capable of hibernating or suspending their operations, using the system power management capabilities. This feature is implemented to save energy on desktop computers, and to extend the battery life of portable computers. Super OS switching as described herein can be applied to any OS capable of hibernation and suspension. The Super OS Agent will suspend the currently running OS, as desired by the user, and allow the user to resume or reboot another OS into operation on the same PC. In this way the currently selected operating system is taken from a current state to a suspended state. The active operating system environment runs in native mode, without any emulation, and can fully utilize all system resources without any performance penalty and without requiring any modifications.

The prior art MBR has been updated to allow for VTOC enhancements as depicted in FIG. 2.

The VTOC pointer is used in conjunction with an Initial Program Loader ("IPL") program to transfer control of the PC Boot process to the Super OS. The Super OS then allows the user to control the PC and select a virtual operating system environment.

The Partition table is maintained in the format depicted in FIG. 2 to satisfy the runtime OS requirements. It is important to note that in a multiple OS environment, the MBR is a dynamic data structure and may be updated depending on the active OS environment. Microsoft Windows operating systems rely on the MBR data for locating the file systems and for mounting logical disks. The Super OS builds the MBR partition table, making only those partitions and logical drives visible that the user has placed into the current Cabinet. If the user boots a Cabinet, or resumes a previously suspended or hibernated Cabinet to a current state, the Super OS updates the MBR so that the runtime Operating System has access only to those partitions and file systems that the user has included in that virtual environment. All other partitions, file systems, and unused disk space are hidden by the Super OS to protect the files, folders, and other information from the currently running OS, its applications, users, and potential viruses.

FIG. 3 depicts the hard disk structure of a typical Virtualized PC with VTOC. The Super OS Boot Manager is loaded by the Super OS IPL. The Super OS Boot Manager determines which Cabinet to boot or resume. Other partitions (not included in the VTOC for the runtime OS) are hidden, and the active OS running in the Cabinet does not have access to the hidden partitions. The VTOC dynamically loads the Partition Table in the MBR for the active OS. One partition table entry is reserved for suspending the current OS.

The Super OS ("SOS") is started by the Super OS IPL. This IPL, in the MBR, loads the Super OS Boot Manager. The SOS Boot Manager then loads either the default OS or the Super OS GUI (OS Manager).

Figure 4:
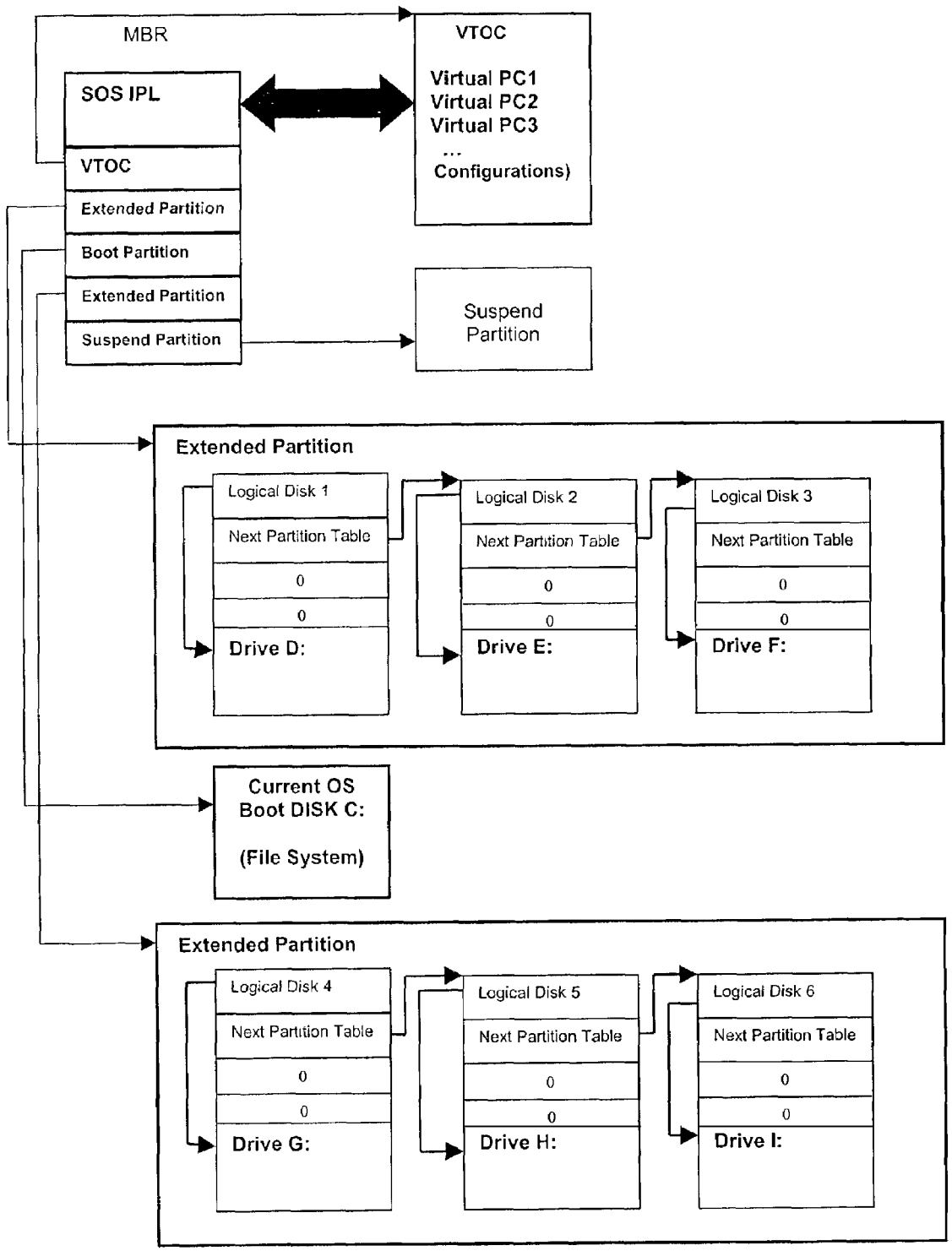
FIG. 4 depicts the Virtualized storage layout.

The secondary storage or hard disk storage is virtualized based on dynamically loading the MBR and partition table information from the VTOC so that the runtime OS (which assumes control of the storage) has the necessary information as though it is running on a single OS system. The partitions of the runtime operating systems (Virtual PC's) cabinet must all be visible, and all other partitions must be hidden or restricted. The MBR is updated to contain the new partition table entries. The virtualized storage layout is depicted in FIG. 4.

Applying the foregoing as depicted in FIG. 1, a PC, Laptop, or Server can be virtualized to operate multiple environments as though the user owns multiple PCs, Laptops, or Servers. The Virtual PCs can be booted and operated as though each is the entire physical system. For example, if a user clicks on the Windows PC shown, he will be operating the PC as though it were a Windows PC. Clicking on the Red Hat Linux logo will turn his laptop or PC into a Red Hat Linux laptop or PC.

The Virtual PC can be the PC whose contents are provided from the actual resources on the physical PC. These resources include storage devices that may be local or remote. In a local storage mode, the Virtual PC's file system resides on a partition or partitions on the storage devices attached to the local systems. A virtual system can have its file systems resident on another PC or server that is connected to the local PC by a network.

Figure 5:
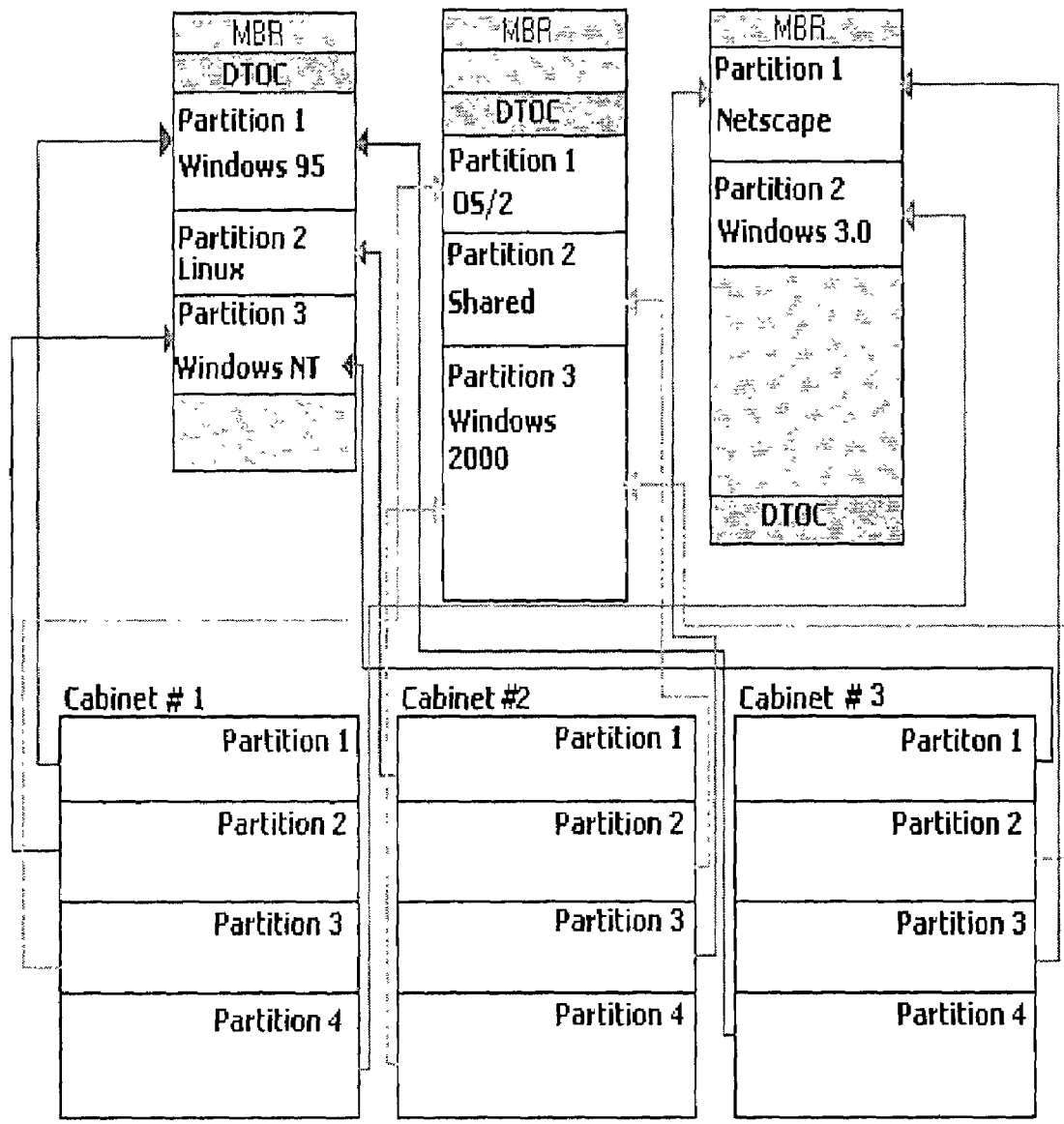
FIG. 5 depicts a multi-OS Virtual PC environment with multiple hard disks.

In a single OS PC, the boot partition is usually either the only partition on the disk or the first partition on the disk. In a multi-OS Virtual PC environment with multiple hard disks, as depicted in FIG. 5, there can be numerous partitions on the disk, some or all of which can be bootable. As a result, at any given time, there can be logical drives or primary partitions before and after the boot partition. The Super OS organizes these into logical drives inside extended partitions, pointed to by the partition table of the MBR, before giving control to the system in the boot partition.

The Super OS GUI is the graphical user interface that enables users to create, define, and manage the system resources (storage in particular) for easy operation of multiple OS environments. This interface allows a user to manipulate cabinets or Virtual PC's (environments). The user can create, delete, update, remotely manage, and view cabinets, boot any partition, suspend, resume, view and change attributes, manipulate partitions, enable VTOC, save VTOC, update VTOC, and provide other user controls such as password protection, setting the default cabinet, and obtaining direct Internet site access. In the exemplary embodiment, the Super OS GUI provides a selection means for choosing one of the available operating systems and corresponding virtual computer systems.

Using the Super OS GUI, the user can double click on any cabinet to boot (or Resume) that environment. The GUI menu has separate functions for cabinets (Virtual PC's), VTOC, and Partition utilities.

OS Switching Via the Power Management Suspend/Resume Procedures

The following steps are involved in a Super OS Suspend procedure:
1. In response to a user request, the Super OS Agent notes the Cabinet to be loaded next in the VTOC and sets the SOS_FLAG in the BIOS scratch storage area.
2. The Super OS Agent invokes the Suspend facilities of the currently active OS environment, causing the latter to save its current state. in the designated Suspend storage area of the currently active Cabinet.
3. After the suspend operation completes, the BIOS recognizes that the SOS_FLAG is set, and therefore immediately performs the actions that normally follow a power-on of the computer, instead of turning off the computer's power, as would normally be the case after a Suspend operation.

The Following Steps are Involved in a Super OS Resume Procedure

1. The BIOS loads the standard IPL, which activates Flash Vos.
2. Flash Vos recognizes the desired new Cabinet noted by the Flash Vos agent during the Suspend procedure, and adjusts the MBR to reflect the newly activated Cabinet.
3. Flash Vos invokes the BIOS resume procedure, which restores the state of any previously suspended OS environment from the Suspend area of the newly activated Cabinet. This process resumes the OS environment that was previously suspended in the newly activated Cabinet. If no suspended OS environment exists in the newly activated Cabinet, then the BIOS boots the operating system associated with that Cabinet. Prior art power management facilities are designed to suspend operating system environments to save power. Super OS virtual operating systems use these features to temporarily suspend an operating system environment (Virtual PC) and allow the use of system resources by another OS environment (virtual PC). In this manner, a Super OS allows rapid switching between multiple OS environments (virtual PC's) on the same computer (physical PC), without requiring the shutdown of one OS and booting of another OS.

Super OS BIOS Switch

The following illustrates the simplified BIOS power management functions. The Super OS switching changes are shown in Bold Italic.

```
Start BIOS:
   Start:
      Resume From Suspend (Interrupt):
      Check MBR (Suspend Partition):
```

-continued

```
        IF Suspend Context Present;
        Then If (Flag) Restore Contents
            Resume Operation of Suspended OS
    POST:
        Check Flags
        Check Memory
        Check Devices
        Configure Devices
        Check Virus, Network, Options
        Build Tables, Memory Information
    IPL:
        Load IPL
        Transfer Control
        EXIT
    SUSPEND:
        Save Context
        Set Flag
            If SOS_FLAG
            Then IPL
                EXIT
        Power Down.
    BIOS_Setup:
        GUI Interface,
        Allow user BIOS Configuration
            User Can Set SOS_FLAG (Y or N)
    BIOS END:
```

Standard BIOS Operation

1. Major BIOS Tasks and Operations Flow: Restore (if Suspend)

2. POST

3. IPL

4. Suspend (Power Saving)

5. Power off

Super OS BIOS Operation

The new operation in a Super OS ("SOS") and Fast Switching environment:

1. POST

2. IPL

3. Restore (if Switch_flag and Suspended)

4. Suspend (then IPL if SOS_Flag)

5. Power off

6. Resume from Suspend.

Where:

| | |
|---|---|
| SOS_FLAG | is a flag that can be set in Advanced Setup of BIOS |
| Switch_Flag | is a flag that can be set up in storage to differentiate Between Suspend for Fast Switching and Power Save Suspend. |

In this mode, a small window for entering the BIOS Setup is provided. This allows the SOS_FLAG to be set, if necessary, to perform POST for configuration changes, or the SOS can perform a "BIOS Reset" to enter POST.

Super OS Switching Algorithm

The following algorithm illustrates the switching between OS environments using the Suspend/Resume process.

Assume that we have a PC with two OS's (or Virtual PC's), referred to herein as OS1 and OS2, and OS1 is set up as the default OS. The following algorithm outlines the process of starting the computer, running OS1, switching to OS2, suspending OS1, starting OS2, switching from OS2 to OS1, suspending OS2, the Super OS resuming OS1, and finally shutting down the computer by suspending OS1.

Power On Computer:

```
BIOS runs POST
BIOS boots Super OS
    Super OS selects and boots the default OS (OS1)
        User activates Super OS Agent in OS1,
            Selects switchover to OS2
            Agent notes the (Suspend OS1/Boot OS2)
                Super OS updates VTOC (or VTOC.DAT)
                Dismounts Shared (non-networked) file systems
            Suspends OS1.
                Interrupt BIOS to Suspend/IPL (OS1),
                BIOS Saves Context to Save Partition or file OS1 Save
                BIOS IPL's Super OS (no power off).
    Super OS runs and detects VTOC changes (next OS)
    Super OS Switches Virtual PC's MBR
    Super OS boots OS2
        User activates Super OS Agent in OS2,
        Selects switchover to OS1 Environment
        Super OS Agent notes the (Suspend Current/Resume OS1)
        Super OS Agent updates VTOC (or VTOC.DAT)
        Suspends OS2
        SOS Agent dismounts Shared file systems
        Interrupts BIOS to Suspend/IPL (OS2),
        BIOS saves Context to Save Partition or File OS2 Save
        BIOS IPL's Super OS (no power off)
    Super OS runs and detects VTOC changes (next OS)
    Super OS switches Virtual PC MBR to OS1
    BIOS Resume
        BIOS restores context from OS1 Save or File OS1 Save
        Resumes OS1
            OS1 mounts shared file systems.
            Resuming OS1 from last suspend
```

The Super OS BIOS allows the user to select a flag called "Suspend Power Off" in the BIOS setup. The default value of this flag is "Yes", meaning the BIOS will turn off the power after a Suspend for a single OS environment. However, for virtualized PC operation with multiple OSes, this flag is set to "No". This means the BIOS will return from Interrupt, after saving the current context, to resume Super OS operation. The file system refers to a partition, logical device, or virtual device containing formatted secondary storage.

Note that shared file systems (partitions or logical devices) must be noted in the VTOC entry of the logical PC. This is needed to coordinate the mount/dismount functions for non-networked file systems. Also, shared file systems can be implemented in a manner similar to removable devices, and dismounted before suspending the runtime OS. This will prevent data corruption or operating system crashes during switching, wherein a modified file system will be refreshed (mounted and opened again) after resumption of runtime OS operations.

Virtualized secondary storage devices are a significant pre-requisite for this switching method. Software virtualized storage devices must apply a mechanism for the import and export of entries to the MBR partition table. This process is described in previous sections as a means to successfully export suspended OS (Virtual PC) partitions for protection and safeguard of operation states. It is also a means to import the proper OS (next Virtual PC), and to resume its operation with system state and MBR exactly as they were when it was suspended.

Referring again to FIG. 1, the user accomplishes a switch of operating system environments by clicking on the desired Virtual PC (OS).

Figure 6:
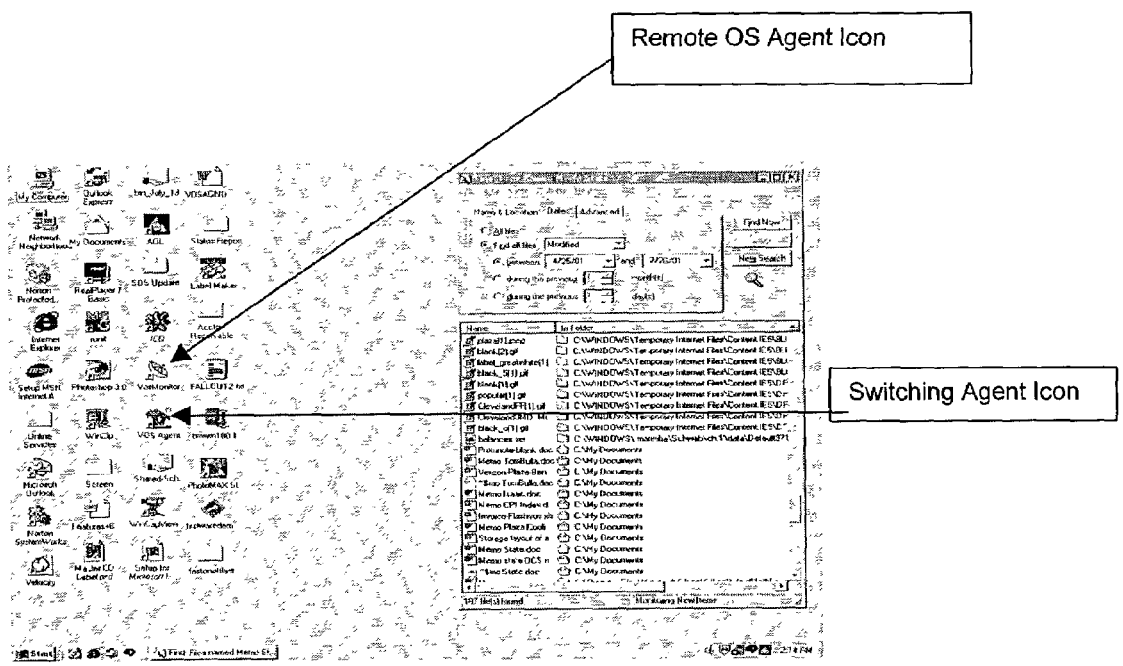
FIG. 6 illustrates a GUI for remote switching of Operating Systems via Super OS Agent.
Figure 7:
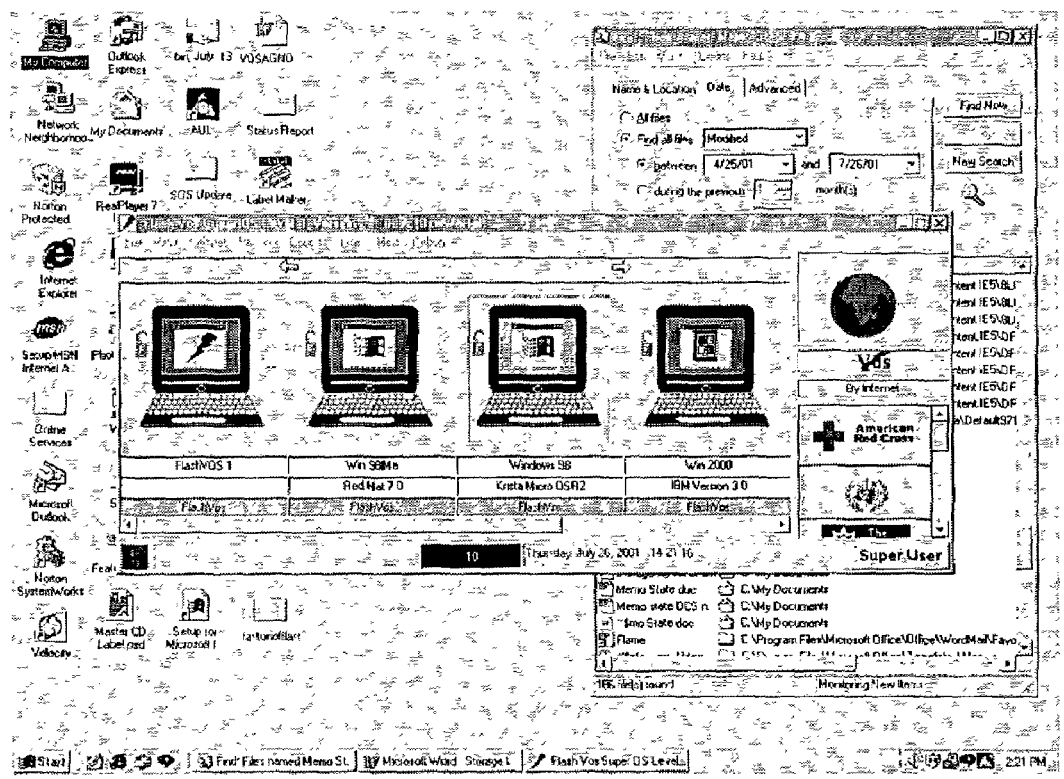
FIG. 7 illustrates a GUI for switching between the available Operating Systems in the computer.
Figure 8:
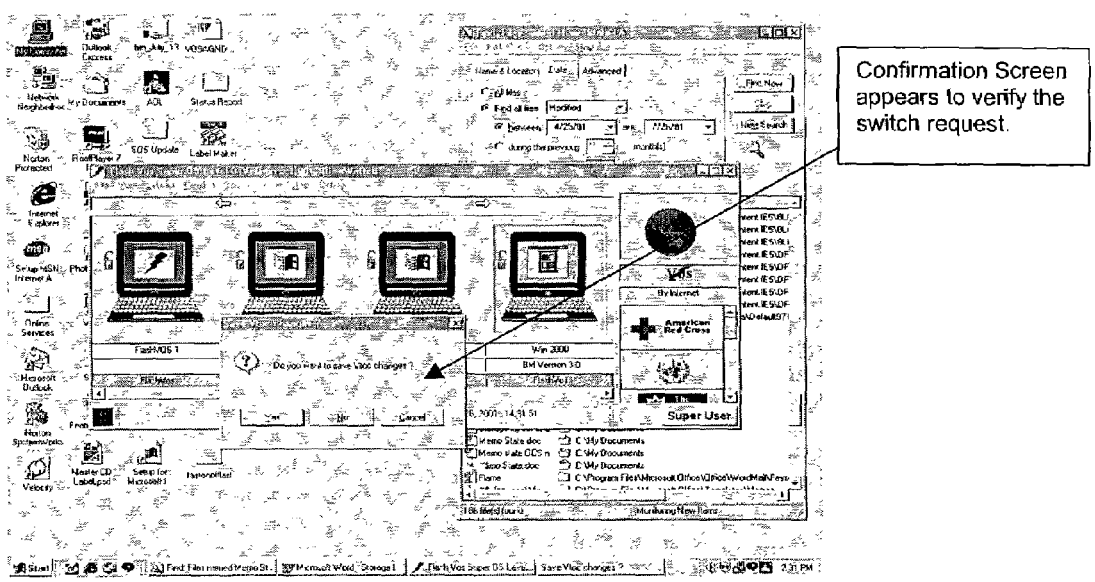
FIG. 8 illustrates the confirmation box to confirm the selection of a particular Operating System environment.
Figure 9:
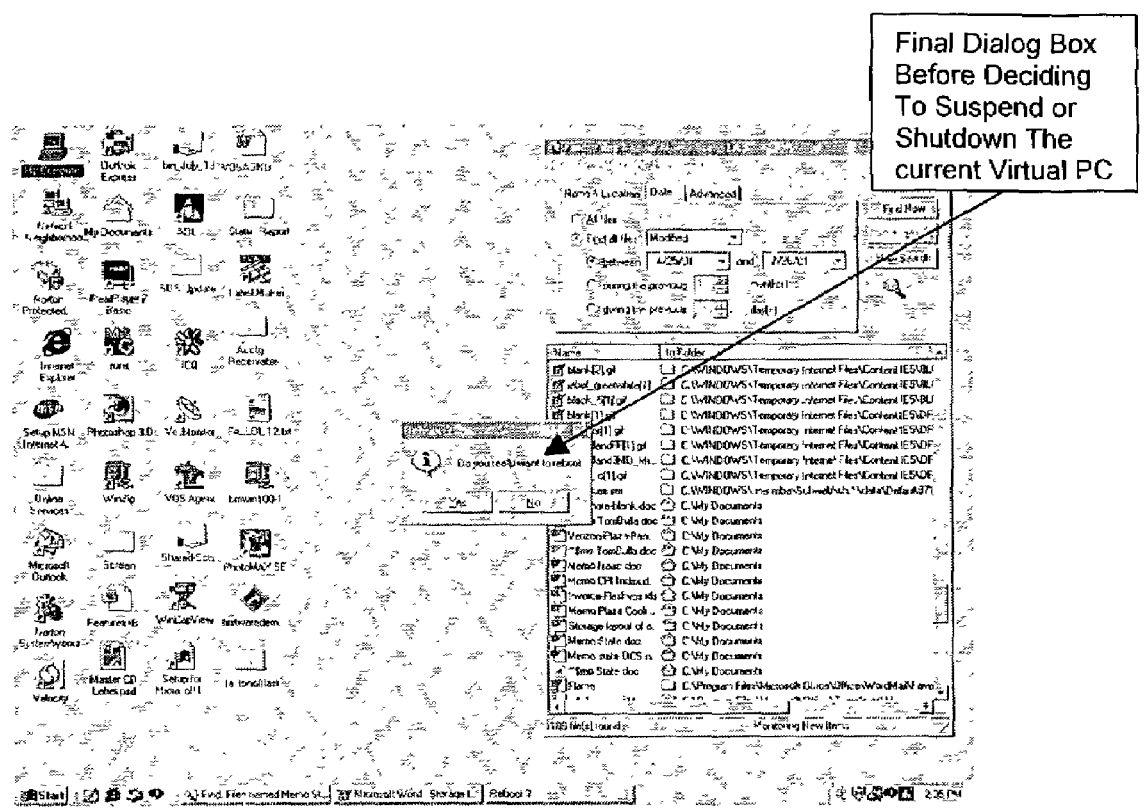
FIG. 9 illustrates a GUI with an option box for the user to Suspend or shutdown the currently running Operating System.

FIGS. 6 through 9 depict a GUI for remote switching. The Super OS Agent provides users with the functionality to switch their Operating System environments. In Windows 98, as depicted in FIG. 6, a user can click on the Super OS Agent icon to activate the Super OS Agent. Once activated, the Super OS Agent will find out about other OS environments available to the user and allow him to switch to another target OS. The GUI depicts the currently running OS, plus other available OS's (Virtual PC's). The user may then click on another Virtual PC. As depicted in FIG. 8, the GUI provides a confirmation box to confirm the selection. Referring to FIG. 9, the user is then given an option to suspend or shut down the currently running OS. The next Virtual PC is set to Resume or restart by means of changes to the VTOC as requested by the Super OS Agent.

FIG. 10 provides a schematic representation of the steps of an embodiment of the invention, including generally:

Power on 100 of the computer system. Such a power on 100 includes the typical BIOS boot sequence Power-On Self-Test ("POST") check 102, identification of a device containing a valid Master Boot Record ("MBR") 104, and loading of the Super OS 106. Upon loading of the Super OS, control of the computer is turned over to the Super OS Initial Program Loader ("IPL"). The Super OS IPL proceeds to check the system resources. If Super OS does not identify a Fast Suspend Flag (described herein), Super OS proceeds to load OS1, the default OS 114, in the manner of a cold start, including activation and verification of utilities and service programs, libraries, devices, and networks.

If Super OS identifies a Fast Suspend Flag 108, Super OS provides the option 110 of loading the OS1 system context as suspended from a prior operation of the computer 112. If restoration of the stored OS1 with its system context as stored is elected, Super OS restores OS1 with such a context 112. The Fast Suspend Flag is identified by a search of non-volatile Save Space or non-volatile random access memory ("NVRAM"). If it exists, the Fast Suspend Flag will have been set prior to a previous Power Off. If the user elects not to restore OS1 with its system state as stored at the time of suspension, Super OS will proceed to cold start OS1 114.

At this stage, the user is able to operate OS1 116.

The Super OS Agent is resident in the runtime operating system by virtue of having been loaded with the Super OS. The Super OS Agent comprises a software program that, among other things, provides communication between the Super OS and the runtime operating system, OS1.

The Fast Suspend is implemented by accessing the Super OS Agent in OS1 118 and selecting Fast Suspend of OS1 120. For the user, step 118 may comprise clicking a button to active the Super OS GUI, and step 120 may comprise clicking a Fast Suspend option depicted by the Super OS GUI.

Upon selection of the Fast Suspend step 120, Super OS will suspend OS1 122. Suspension step 122 involves copying the contents of the volatile memory and registers, also referred to as the system context, system contents, or "contents", into a non-volatile reserved "Save Space" such as the Power Save partition on a secondary storage device (e.g., disk or flash memory). In the final step 124, Super OS powers off the computer system.

Figure 11:
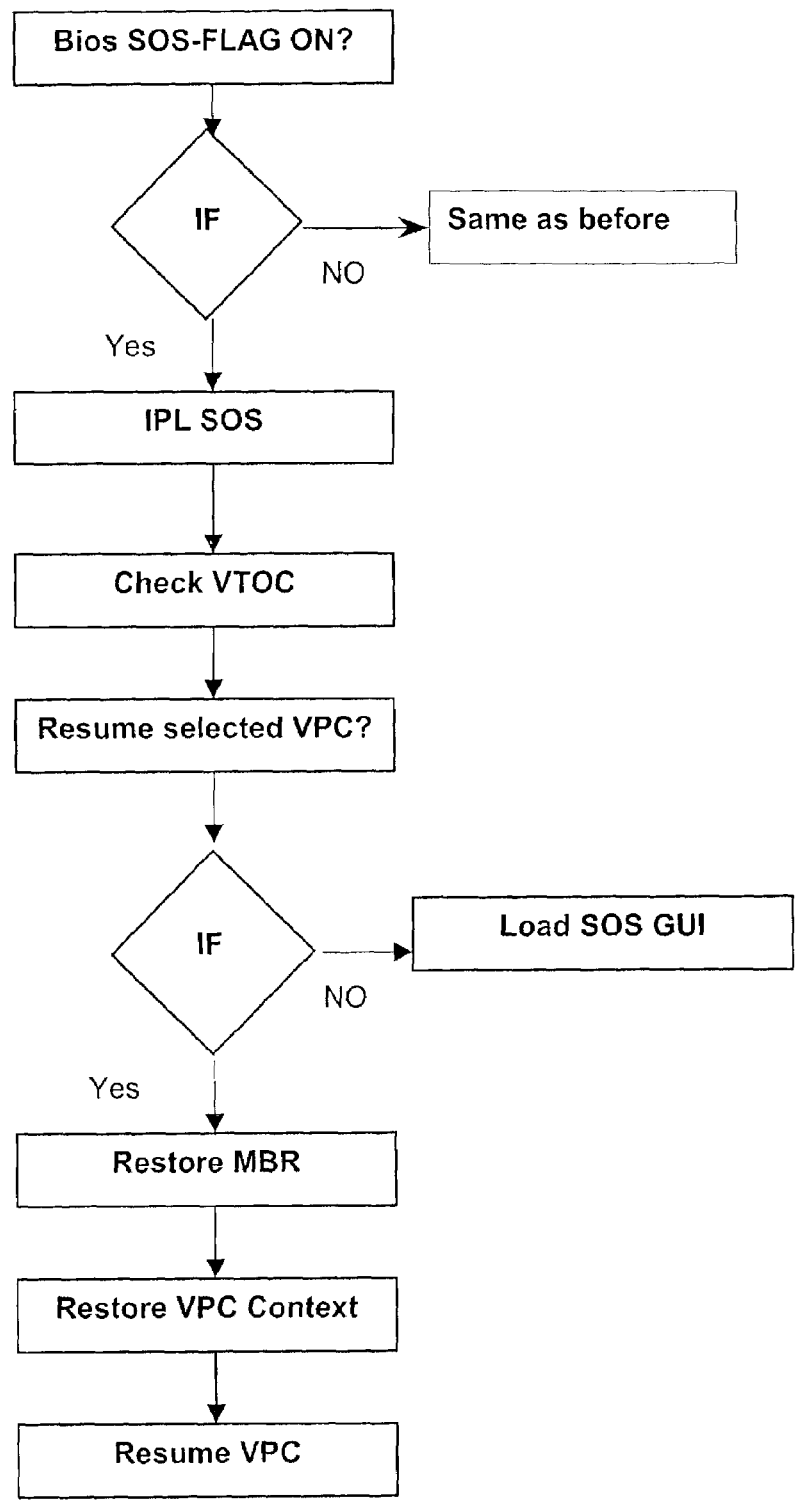
FIG. 11 is a flowchart depicting the Super OS Fast Resume block diagram.
Figure 12:
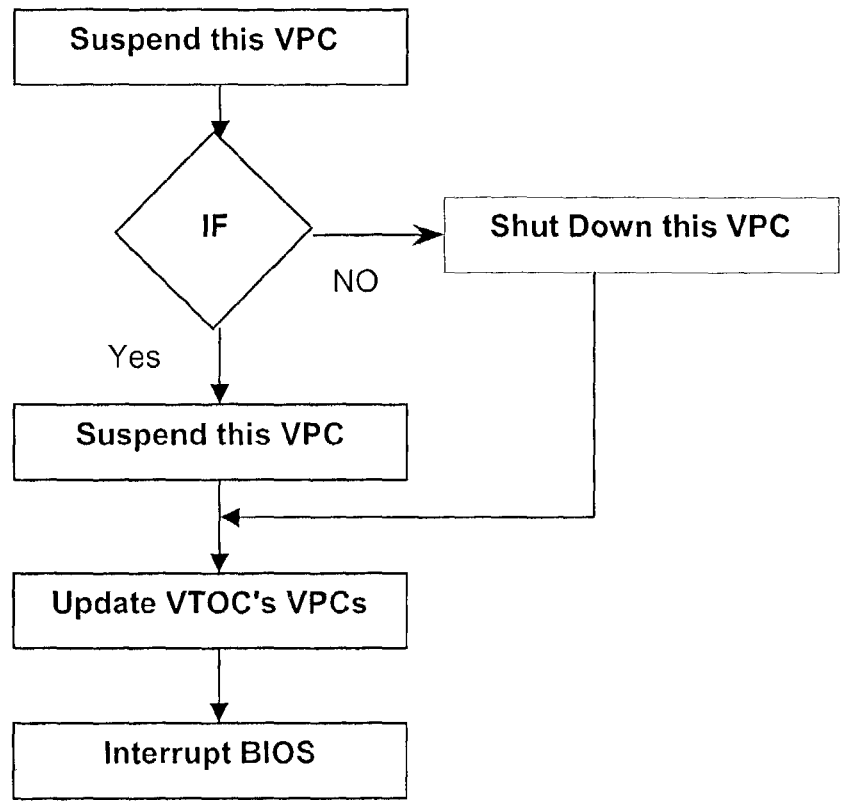
FIG. 12 is a flowchart depicting the Super OS Fast Suspend operation block diagram.

FIG. 11 is a flowchart depicting the Super OS Fast Resume block diagram. FIG. 12 is a flowchart depicting the Super OS Fast Suspend operation block diagram. In FIGS. 11 and 12, "VPC" represents "Virtual Personal Computer."

An embodiment comprises use of one of the MBR partition table entries as a storage area to hold the suspended state of an OS environment. For example, the Phoenix NoteBIOS can be used to set up a "Save" disk partition on the hard disk drive for storage of memory and register contents for the Suspend operation. Upon a Resume (power up or restart), the MBR Partition Table entries are scanned by the BIOS for a partition of compatible type. Partitions have unique identifier codes; the Phoenix NoteBIOS uses type "A0" (hex) to identify the partition type compatible with its power management features. If an appropriate partition is found, the BIOS scans the partition for a flag. If the flag is set, the state of the system is restored from this partition, resulting in a Resume of the OS environment. This bypasses the normal power on boot process that may take many minutes, depending on the set up. Other BIOS products have similar capabilities for suspending the state of an OS environment to a disk storage partition or file, and resuming from this previously saved state.

The BIOS may be enhanced with a parameter that can be set by the user during BIOS setup. This parameter provides the user the option to resume automatically after a suspend, or to simply reboot the IPL and give control of the system to the Super OS after power up or after a resume from suspend. In this way, the user gains the option of resuming any suspended OS.

A Super OS is a computer system supervisor that can manage the computer and network resources by controlling all functions performed by the computer's operating system. A Super OS facilitates and supports the installation of runtime (traditional) Operating Systems and No OS (embedded) applications. One such Super OS is Flash Vos, as described in U.S. patent application Ser. No. 09/285,147, Storage Manager for Computer Devices and Method for Manipulating Secondary Storage, filed by Rafizadeh on Apr. 1, 1999.

The Super OS Agent is a local or remote supervisory program on a computer. It is typically invoked remotely by a supervisor on his computer, and will then connect (through a network connection or the Internet) to a target computer having the program Super OS Server. Note that Super OS Server is NOT a "server", as defined as a network device that manages network resources. Rather, Super OS Server is a local program for a computer that supports remote manipulation of that same computer. The Super OS Server, by reading a current copy of a Virtual Table of Contents ("VTOC") through shared storage, knows which Cabinets, Partitions, OSes, or embedded programs and services are available. Only Super OS Server has access to the current copy of the VTOC. The VTOC contains all the system virtualization information, information that is not visible or accessible to the runtime OSes. This virtualization information includes indices of the current Default Operating System, the different operating systems held in secondary storage, and relevant information regarding each stored operating system, including the starting absolute logical address of the operating system and the starting absolute logical address for that operating system's BOOT block.

The Super OS Agent sends information and operations (including operating systems and their boot routines) to Super OS Server, which then executes the commands. Super OS Agent accesses the Internet using industry-standard methods such as Transmission Control Protocol/Internet Protocol ("TCP/IP").

When operating the invention in the remote mode, the supervisor computer user first invokes (runs) the Super OS Agent, which communicates on-line through at least one network on his system. The supervisor computer user queries the availability of the target environments (or computers) for monitoring and control. If the desired operating system environment is available, the Super OS Agent tells the user of the target computer that it is available, and Super OS Server accesses a copy of the current VTOC.

The Super OS is a Virtual Operating System ("VOS") that is modifiable. The relevant information of the current or default Operating System or default Virtual PC can be stored by the VOS program code, ensuring that the VOS will automatically boot or resume the default Operating System at each boot sequence until the default is changed.

The present invention can utilize any suitable power management interface specifications. The Super OS suspends the currently running OS by placing the computer's running OS into the Hibernate or Sleeping state via the Suspend option. In this state, the processors are not executing instructions, the dynamic RAM context is not maintained, and all devices are in the off (device off) state, as far as the suspended OS's are concerned.

As seen in FIG. 4, the Super OS copies the computer's physical main memory containing the active (running) OS and active applications and their, and places this information into non-volatile Save Space memory ("NVS").

Figure 13:
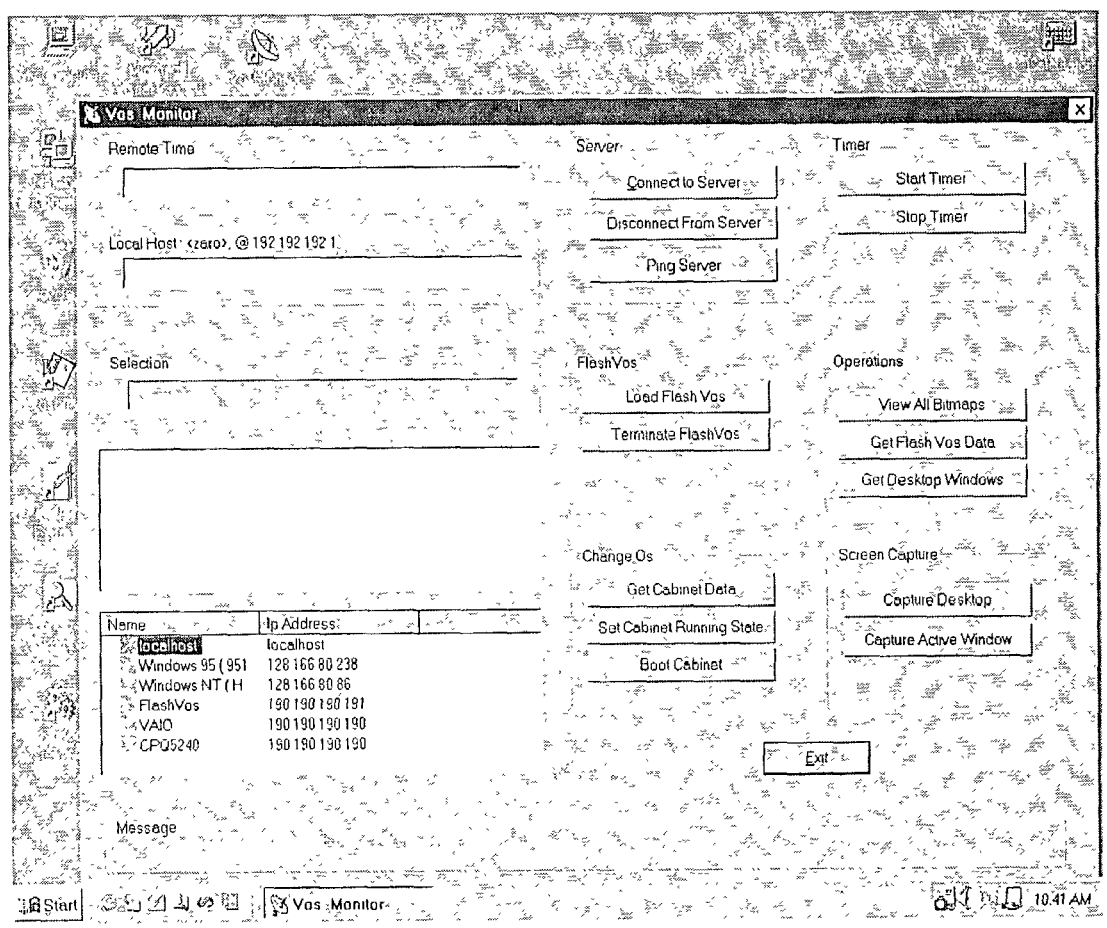
FIG. 13 illustrates a remote operation monitor GUI.

OS switching is accomplished either at the request of the Super OS Server or through the command of the Super OS Agent. If the request is local and from the Super OS Server, all commands to switch OSes are executed by the Super OS Server. If the request is from the Super OS Agent, the Super OS Agent directs the operation of the Super OS Server to switch the OSes. The target computer must have the Super OS Server installed, and must have given permission to the Super OS Agent to take control of its execution and operation. A user utilizes the Agent via the Internet for remote communication, monitoring, and switching of remote computers and operating systems. In this process, additional services are accomplished, such as remote desktop capture and viewing to verify the remote computer's operation during the remote session. FIG. 13 depicts the remote operation monitor screen.

As noted, an exemplary embodiment of the present invention is for switching operating systems. In an alternate exemplary embodiment of the Fast Switching invention, a computer loaded with a single operating system may support the rapid successive use of multiple users, with differing work demands. The current invention permits establishment and rapidly alternating use of multiple working environments, possessing contractory security, authority and access rights to designatable segments of the computer's components. Additionally and/or alternatively, an alternate exemplary embodiment can be configured to use any software, including embedded application programs, that then can be switched utilizing the Fast Switching invention as described above, provided the software supports the industry standard ACPI suspend/resume operations.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

What is claimed is:

1. A hardware platform for a hibernate capable computer system comprising a system manager, said computer system having an OS-independent storage manager operating through a firmware level and a plurality of operating systems and applications, said storage manager having a virtual table of contents for organizing and accessing a plurality of partitions of relevant data and having a plurality of virtual computer systems, each of said virtual computer systems capable of accessing a selection of the partitions, the virtual table of contents (VTOC) being capable of dynamically configuring a plurality of partition tables, said system manager comprising:

means for selecting one of said virtual computer systems to become next operable before suspending a currently operational virtual computer system;

means for suspending the currently operational virtual computer system in an active state;

means for making the selected virtual computer system operable into a running state, and means for switching of the virtual computer systems using a switch flag and BIOS ACPI solutions, and without initialization of power-on self test (POST) in the BIOS, wherein the switch flag is a flag that is set up in storage to differentiate between suspend for fast switching and power save suspend.

2. The hardware platform as in claim 1, wherein:

said means for making the selected virtual computer system operable comprising means for fast resuming said selected virtual computer system.

3. A method of managing a computer system having a plurality of operating systems, a plurality of virtual computer systems, and a virtual table of contents (VTOC) capable of dynamically configuring a plurality of partition tables for fast switching between the virtual computer systems, each of said operating systems configured on a corresponding one of said virtual computer systems and operable within the corresponding one of said virtual computer systems, said method comprising:

providing a selection means for sequentially choosing from among said plurality of operating systems;

initiating a first selected operating system;

fast suspending said first selected operating system; and executing a subsequent selected operating system;

said method utilizing a switch flag and BIOS ACPI enhancements without requiring initialization of power-on self-test (POST) in BIOS, wherein the switch flag is a flag that is set up in storage to differentiate between suspend for fast switching and power save suspend.

4. The method as in claim 3, wherein:

said subsequent selected operating system is a suspended operating system; and said executing step comprises fast resuming said suspended operating system.

5. The method as in claim 3, further comprising the steps of:

fast suspending said subsequent selected operating system; and fast resuming a selected previously fast suspended operating system.

6. A method of managing a computer system and fast switching between operating systems, the computer system having a plurality of operating systems and a plurality of virtual computer systems and at least one cabinet for isolating each virtual computer system from other virtual computer systems, each of said operating systems configured on a corresponding said virtual computer system, said method comprising:
- a fast suspending step comprising fast suspending one of said virtual computer systems in a suspended state;
- an activating step comprising activating another virtual computer system of said virtual computer systems to a running state without rebooting and without initialization of power-on self test in BIOS;
- said fast suspending step and said activating step using a switch flag, a virtual table of contents (VTOC) capable of dynamically configuring a plurality of partition tables, and BIOS ACPI enhancements, wherein the switch flag is a flag that is set up in storage to differentiate between suspend for fast switching and power save suspend.

7. The method as in claim 6, wherein said activating step further comprises:
- fast resuming said another virtual computer system to a current state.

* * * * *

UNITED STATES PATENT AND TRADEMARK OFFICE
CERTIFICATE OF CORRECTION

PATENT NO. : 7,356,677 B1
APPLICATION NO. : 10/274670
DATED : April 8, 2008
INVENTOR(S) : Shumann Rafizadeh It is certified that error appears in the above-identified patent and that said Letters Patent is hereby corrected as shown below:

Replace the sentence at column 5, lines 4-8 with the following sentence:

One of the key features of this invention is the novel use of the power management (advanced configuration and power interface (ACPI) or advanced power management (APM) or alike) support functions of the runtime (standard) OS and the BIOS to temporarily evict that OS from memory and switch to the next OS requested by the user.

Signed and Sealed this

First Day of July, 2008

JON W. DUDAS
*Director of the United States Patent and Trademark Office*